United States Patent [19]

Underhaug

[11] Patent Number: 4,784,540
[45] Date of Patent: Nov. 15, 1988

[54] ROTARY AND YIELDABLE DRIVE MEANS FOR A TOOL

[76] Inventor: Njal Underhaug, Rektor Saelands vei 21, N-4340 Bryne, Norway

[21] Appl. No.: 53,857
[22] PCT Filed: Sep. 23, 1986
[86] PCT No.: PCT/NO86/00068
  § 371 Date: May 12, 1987
  § 102(e) Date: May 12, 1987
[87] PCT Pub. No.: WO87/01641
  PCT Pub. Date: Mar. 26, 1987

[30] Foreign Application Priority Data

Sep. 23, 1985 [NO] Norway ................. 853719
Sep. 22, 1986 [NO] Norway ................. 863763

[51] Int. Cl.⁴ ............................................. B23C 3/12
[52] U.S. Cl. ..................................... 409/140; 29/76.1; 51/165.9; 409/138
[58] Field of Search ............. 29/76 R; 409/138–140, 409/184; 408/130, 141, 146, 702, 714; 51/165.9

[56] References Cited

U.S. PATENT DOCUMENTS

| | | | |
|---|---|---|---|
| 3,712,174 | 1/1973 | Granfield | 409/138 |
| 4,371,297 | 2/1983 | Hirose | 408/130 |
| 4,543,022 | 9/1985 | Bonner | 409/139 X |
| 4,610,075 | 9/1986 | Eriksson | 409/232 X |

FOREIGN PATENT DOCUMENTS 131106 7/1985 Japan ................. 409/139

Primary Examiner—Gil Weindenfeld
Assistant Examiner—Steven C. Bishop
Attorney, Agent, or Firm—Young & Thompson

[57] ABSTRACT

The combination of a rotary tool and a drive therefor, the tool having a conical taper between 60° and 120° to chamfer or remove burrs from machined workpieces. The tool comprises a casing containing a motor for rotating the tool, the motor having a drive shaft connected for rotation to the tool, and the tool having a shaft coaxial with the drive shaft. The drive shaft and the tool shaft are elastically connected for axial sliding movement of the tool shaft relative to the drive shaft against a force urging the tool shaft in a direction away from the drive shaft. The drive shaft is splined, and the tool shaft has thereon a splined member surrounding and engaging with the splines of the drive shaft. The tool shaft is mounted in a piston for rotation, and fluid pressure is supplied to the piston in a direction to urge the piston away from the motor, by conveying air under pressure through the motor and through the drive shaft to a region between the drive shaft and the tool shaft communicating with a face of the piston to urge the piston away from the motor.

6 Claims, 1 Drawing Sheet

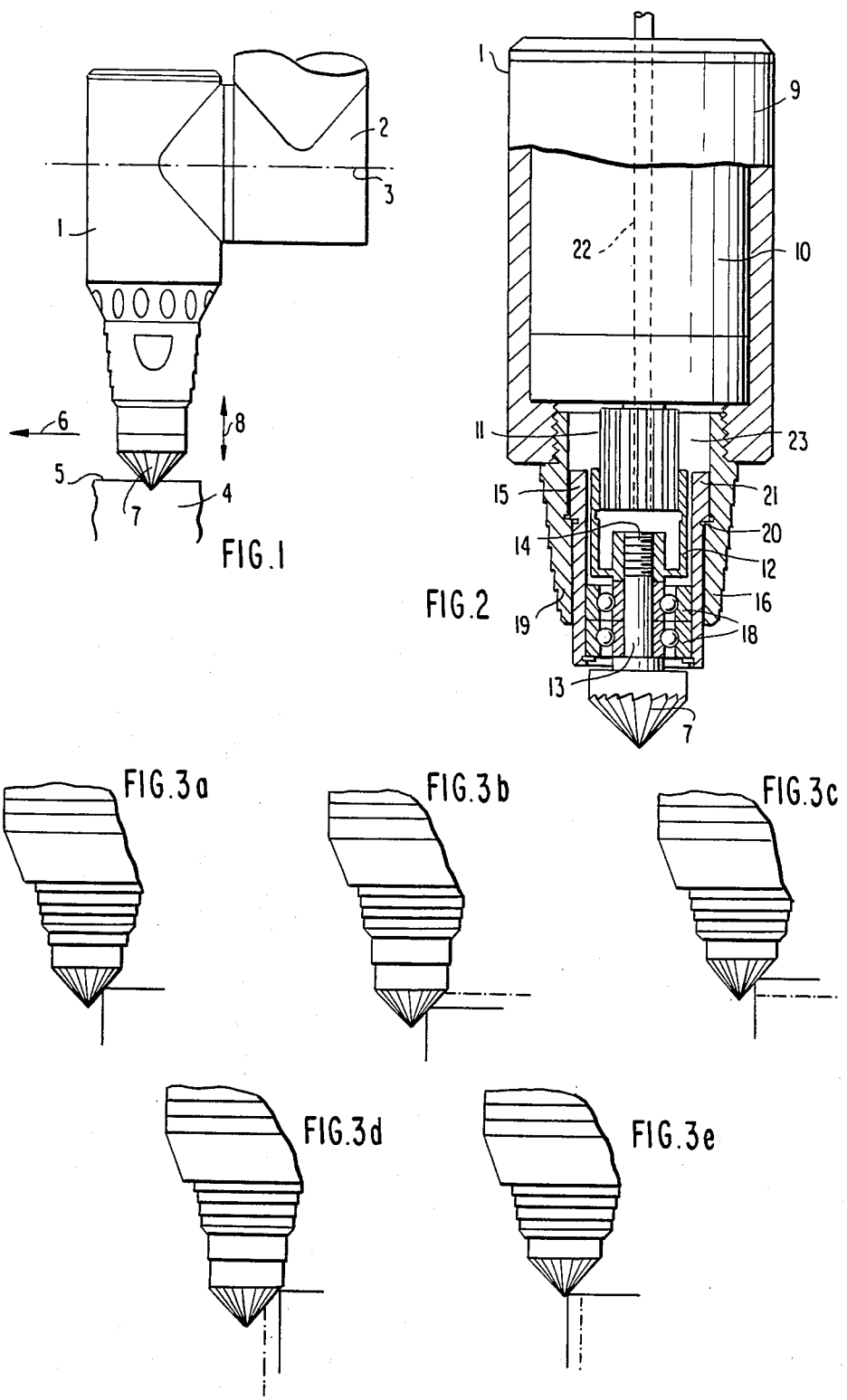

ROTARY AND YIELDABLE DRIVE MEANS FOR A TOOL

The present invention relates to a device in a rotating drive means for a tool, e.g. a burr or a milling tool, intended for mounting on the arm of an industrial robot or another automatic device for burring onmachined workpieces or the like, comprising a casing with a motor, especially a pneumatic motor for actuating said tool.

Removal of burr on a workpiece by the aid of an industrial robot is a new and difficult application with special demands ont he dynamic properties of the robot. Such a robot should be able to follow a conour on a workpiece with great speed and accuracy at thesame time as varying forces are transmitted from the burring tool to the robot arm. Widespread use of industrial robots for burring is completely dependent on a reduction of cycle periods and increase of flexibility. The present robots operate with high speed, but with large and heavy tools attached tot he robot arms, the properties that may be achieved are reduced below acceptable levels. At the same time as more rigid and more lightweight robot structures as well as improved servo systems are developed it is, thus, necessary to reduce themass which a robot must move—the tool mass.

Using robots there were, at certain times and inconnection with special applications problems with inaccuracy of the workpieces and their fixation in relation to the programed path of the robot. In connection withmilling and burring it is necessary to compensate for such inaccuracies by introducing a flexible movement between robot and workpiece. Wear and tear of the milling tool and subsequent changes of geometry in the same cases of application also resulted in a demand for ocmpensating for such wear and tear.

In principle, three different methods may be used for generating and maintaining a constant or adjustable force between milling tool and workpiece:

(a) Soft servo—i.e. the servo (power feedback) of the robot is used as a spring.
(b) Flexible tool—i.e. there is a spring suspended tool.
(c) Flexible workpiece—i.e. the workpiece is suspended in a spring means and the tool is, thus, rigidly fixed to the robot (or to the support if the used robot is carrying the workpiece).

In removing burr, i.e. removing loose material, and bevelling and corresponding applications method (b) mainly proved useful. with this method the entire tool or portions of the tool can be spring-cushioned.

In case of great speed across an uneven surface it is improtant that the mass of spring is as little as possible (cf. cars and wheel suspension on potholed roads).

When external and internal circular arcs or arcuate contours are to be burred it is important too that the tool is constructed to place the centre of gravity of the burring tool as closely to the central axis of the circular arc as possible. This distance is called centre of gravity distance in this context.

The tool previously used for burring was characterized by the fact that the elastic force and, thus, the elastic movement had a direction orthogonal to the axis of rotatio of the burring tool, and that the entire tool for burring was springcushioned. Rubber suspension secured spring action in all directis orthogonal to the axis of rotation. This resulted in problems in connection with vibrations of the burring tool. Consequently, the restriction was adopted that the tool only tilts about one axis that is orthogonal to the axis of rotation. THe force is provided, e.g. by a mechanical spring arranged to have an approximately linear characateristic and, thus, yielding an approximately constant force of contact with the workpiece. The disadvantages of the presenst methods are:

(a) The tool must not only follow the burr but requires a change of the orientation of the axis of rotation for burring circular arcs or arcuate contours extending in one and the same plane. This means that the robot must have an additional degree of freedom (servo), just for this orientation. An additional servo outermost on the robot arm has a very negative influence on the dynamic qualities of the robot.
(b) To prevent the weight of the tool from influencing the force of contact invarious orientations in space the tilting axis must be placed through the centre of gravity of the grinding tool. This involves large and heavy means of suspension.
(c) The geometry of tools will result in a large gravity center distance.
(d) The large inertial mass of grinding tool interferes with high speed on rough burrs (large cushioned mass).

The main object of the present invention is to propose a drive means for a tool, e.g. a burr or a milling means or the like intended for mounting on the arm of an industrial robot for burring of machined workpieces or the like, so that an additional degre of freedom ont he robot may be avoided and that the mass that has to be moved to compensate for inaccuracies of the workpiece is as small as possible, and the gravity centre distance is made as small as possible. It is, furthermore, an object fo the invention to indicate, more specifically, a practical embodiment of such a drive means.

The object of the inventio s achieved by a device of the above mentioned kind that is characterized by a combination of the following features:

the milling tool or burr is conically tapered with an angle between 60° and 120°, preferably approximately 90°, and the milling tool or burr is made axially movable and continsuously urged by a force in a direction outwards from he device. According to a further feature of the inventio the contact force stays equl, independently of the orientation of the device in space during one and the same operation.

A practical embodiment according tohe inventin is characterized by the fact that a sleeve is provided, via splines on the motor shaft, with the tool shaft rigidly fixed ot the free end of said sleeve, that the shaft is rotatably mounted in a sleeve shaped piston, coaxially arranged outside said sleeve, and that the piston is arranged to be rotatable and axially movable in a cylinder in said casing, with an air duct for supplying compressed air to actuate said piston extending tos aid cyliner.

Further details of the inventio will apperar fromt eh following disclosure in connection witht he drawing showing anembodiment of the invention, and wherein FIG. 1 shows a drive means according tot he ivnention mounted at the end of a robot arm, FIG. 2 shows the device, partly in sectin, and FIGS. 3a through 3e show the device in use for burring workpieces of different shapes, illustrating deviation relative to a nominal workpiece.

FIG. 1 shows a drive means according to the invenion, generally designated 1, and attached to he end of a robot arm by the aid of a mounting support 2, that is turnable or tiltable about an axis 3. The device is viewed during treatment of a workpiece 4 where burr 5 is to be removed. During burring device 1 is moved by the robot in the direction of arrow 6. To compensate for any possible irregularityies on said workpiece tool 7 is axially movable back and forth in the direction of arrow 8 in device 1.

In FIG. 2 the structure of the device is shown in section. The device mainly comprises a casing 9 wherein a motor 10 si mounted. By the aid of sliding grooves or splines a sleeve 12 is mounted to be axially movable on motor shaft 11 and on the outer free end of said sleeve 12 the spindle 13 of a conical burr 7 or millingmeans is secured byt he aid of a threaded connection 14. Coaxially outside sleeve 12 another sleeve 15 is provided to act as a piston and is axially movable in a sleeve shaped extension 16 of casing 9. Spindle 13 is mounted byt he air of bearings 18 on the inside of said sleeve shaped piston 15. Sleeve shaped cylinder 16 has a stepped portion 19 so tht a circular edge 20 facing inwards is formed. Piston 15 is provided witha thickened part or flange 21 at its inner edge, and the outer edge of said thickened part or flange cooperates with edge 20 to limit the axial outward movement of piston 15. Through the rotor of motor 10 on air duct 22 extends and opens at the outer end of motor shaft 11. Compressed air supplied through duct 22 will, thus, enter sleeve 12 and flow through the gaps in the splines on shaft 11 and into cylidner space 23 behind piston 15. Sleeve 12 and piston 15 are machined with a certain mutual clearance, so that a smaller volume of air will leak out into the slot between said means. This will lubricate and cool the bearings and blow away shavings and dust to prevent the latter from entering the devie or the bearings when the tool is in use.

FIGS. 3a through 3e show how the devie according tot he invention will compensate for deviations of the workpiece dimensions and deviations of position. In the Figure marked 3a the position of the workpiece equals the nominal positoin for which the program of said robot is arranged. In FIG. 3b the workpiece has a positive axial deviation, and burring is achieved due tot he fact that tool 7 is automatically displaced somewhat forward by the constant air pressure. In FIG. 3c there is a negative axial deviation, and the tool is retracted further into said device. In FIG. 3d a negative radial deviation is present, and burring is achieved by the fact that the tool is extended out of the device and in such amanner that burring occurs ont eh outside portion of hte cutting face of said tool. In FIG. 3e there is a positive radial deviation, and the tool is here ured into said device, and burring is achieved at thecentral portion of the cutting part of the tool.

As will appear from thea bove, automatic adaptation of the tool is achieved in case of smaller deviations of various workpieces. Burring may occur when said device is guided with the same angle relative to the burr in the same plane all the time. In axial movement of the tool, which is the only necessary movement for adaption of the tool to smaller irregularities, it is only necessary to move a small mass, i.e. sleeve 12, tool 7 with spindle 13, piston 15, and bearings 18. In a practical embodiment said means have a total weight of 45 g. By the device according tthe invention a most stable structure is achieved, the radial munting being provided directly inside on spindle 13, and the axial mounting being outermost. By using an air piston for the axial movement a constant pressure may be achieved on the tool in all axial positions.

Piston 15 can rotate freely in cylinder 16. Thus, static friction and jamming are avoided.

I claim:

1. In combination, a rotary tool and drive means therefor, the tool having a conical taper between 60° and 120° to chamfer or to remove burrs from machined workpieces, the tool comprising a casing containing a motor for rotating the tool, the motor having a drive shaft connected for rotation to the tool, the tool having a shaft coaxial with said drive shaft, and means elastically connecting the drive shaft and the tool shaft for axial sliding movement of the tool shaft relative tot he drive shaft against a force urging the tool shaft in a direction away from the drive shaft.

2. Structure as claimed in claim 1, said drive shaft being splined, said tool shaft having thereon a splined member surrounding and engaging with the splines of said drive shaft.

3. Apparatus as claimed in claim 2, and a piston within which said tool sahft is mounted for rotation, and means to supply fluid pressure to said piston in a direction to urge said piston away from said motor.

4. Apparatus as claimed in claim 3, said means for supplying fluid pressure comprising means for conveying air under pressure through said motor and through said drive shaft to a region between said drive shaft and said tool shaft and thence to a region surrounding said drive shaft and communicating with a face of said piston to urge said piston away from said motor.

5. Apparatus as claimed in claim 4, and bearing means by which said tool shaft is rotatably supported within said piston.

6. Apparatus as claimed in claim 3, said piston being rotatable in said casing.

* * * * *